United States Patent
Kawasaki

(10) Patent No.: US 8,488,525 B2
(45) Date of Patent: Jul. 16, 2013

(54) MOBILE RADIO COMMUNICATION SYSTEM INCLUDING RADIO RESOURCE SHARING FUNCTION

(75) Inventor: Takeshi Kawasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 561 days.

(21) Appl. No.: 12/604,896

(22) Filed: Oct. 23, 2009

(65) Prior Publication Data

US 2010/0041388 A1 Feb. 18, 2010

Related U.S. Application Data

(63) Continuation of application No. PCT/JP2007/058982, filed on Apr. 25, 2007.

(51) Int. Cl.
*H04W 4/00* (2009.01)

(52) U.S. Cl.
USPC .......................................... 370/328; 370/329

(58) Field of Classification Search
USPC ................... 370/328, 329; 455/422.1, 550.1
See application file for complete search history.

(56) References Cited

U.S. PATENT DOCUMENTS

| 6,542,494 | B1 | 4/2003 | Sugaya et al. | |
| 6,957,069 | B2 * | 10/2005 | Shah et al. | 455/436 |
| 7,310,761 | B2 * | 12/2007 | Cho et al. | 714/748 |
| 2004/0090924 | A1 * | 5/2004 | Giaimo et al. | 370/252 |
| 2007/0117518 | A1 * | 5/2007 | Cai et al. | 455/67.13 |
| 2007/0147322 | A1 * | 6/2007 | Agrawal et al. | 370/338 |
| 2008/0008132 | A1 | 1/2008 | Ushiki et al. | |
| 2008/0009280 | A1 | 1/2008 | Ushiki et al. | |

(Continued)

FOREIGN PATENT DOCUMENTS

| JP | 2000092076 | 3/2000 |
| JP | 2000165314 A | 6/2000 |

(Continued)

OTHER PUBLICATIONS

Notice of Reason for Rejection dated Dec. 13, 2011 issued in corresponding Japanese Application No. 2009-512838.

(Continued)

*Primary Examiner* — Farah Faroul
(74) *Attorney, Agent, or Firm* — Smith, Gambrell & Russell, LLP

(57) ABSTRACT

A mobile radio communication method in which a radio resource is shared with a first communication between one of first mobile terminal devices and a radio base station, which is performed by using an infrastructure mode for performing communication controlled based on scheduling by the radio base station, and a second communication between a plurality of second mobile terminal devices, which is performed by using an ad hoc mode for performing communication by autonomous distributed control, the mobile radio communication method including advertising, by the one of the first mobile terminal devices in an area in which the radio base station exists, at a timing specified by the radio base station, a radio resource which is usable for the second communication in the ad hoc mode and is not used for the first communication in the infrastructure mode, to one of the second mobile terminal devices that is present in a range which a radio wave reaches from the one of the first mobile terminal devices and performs the second communication in the ad hoc mode, to thereby control the one of the second mobile terminal devices so as not to use a radio resource for the first communication.

1 Claim, 12 Drawing Sheets

U.S. PATENT DOCUMENTS

| | | | |
|---|---|---|---|
| 2009/0059841 A1* | 3/2009 | Laroia et al. | 370/328 |
| 2010/0238868 A1* | 9/2010 | Melpignano et al. | 370/329 |
| 2011/0019646 A1* | 1/2011 | Jeon et al. | 370/331 |
| 2011/0219367 A1* | 9/2011 | Lee | 717/173 |
| 2012/0163349 A1* | 6/2012 | Fontaine et al. | 370/336 |

FOREIGN PATENT DOCUMENTS

| | | |
|---|---|---|
| JP | 200201103 A | 7/2000 |
| JP | 2000201103 A | 7/2000 |
| JP | 2003249939 | 9/2003 |
| JP | 2006101294 A | 4/2006 |
| JP | 2007043435 | 2/2007 |
| JP | 2007110633 | 4/2007 |
| JP | 2008017317 | 1/2008 |
| JP | 2008017318 | 1/2008 |

OTHER PUBLICATIONS

International Search Report dated Jul. 17, 2007.

Japanese Notice of Reason for Rejection dated Sep. 27, 2011 issued in application no. 2009-512838.

Keita Kuramoto, et al., A Real Time ITS Communication System for Vehicle Safety in Intersections, IEICE Technical Report. ITS, The Institute of Electronics, Information and Communication Engineers, May 22, 2006 106 (82), p. 35-39.

* cited by examiner

MOBILE RADIO COMMUNICATION SYSTEM INCLUDING RADIO RESOURCE SHARING FUNCTION

CROSS-REFERENCE TO RELATED APPLICATION

This is a continuation of application PCT/JP2007/058982, filed on Apr. 25, 2007, now pending, the contents of which are herein wholly incorporated by reference.

FIELD

The disclosures made herein relate a mobile radio communication system including a radio resource sharing function.

BACKGROUND

In response to the prevalence of a laptop personal computer, a handheld information terminal such as a personal digital assistant (PDA), and further a cellular phone terminal, mobile radio communication has been used in various places and fields. The mobile radio communication offers numerous advantages to a user who can move while continuing communication, and uses a mobile radio communication terminal device (referred to also as a mobile terminal or a terminal).

Particularly in the field of an intelligent transport system (ITS), a radio base station (referred to also as a base station) placed on a road and a terminal mounted on each vehicle mutually exchange information on surroundings therebetween. At this time, in an advanced safety vehicle (ASV) that prevents a conceivable accident from occurring, it is necessary to implement both of communication performed under the control performed by the base station (infrastructure mode communication) and communication autonomously controlled by each terminal (ad hoc mode communication).

In that regard, in terms of effective use of a radio resource, ease of configuration of a vehicle-mounted terminal, and cost, it is desirable that the same radio resource can be used in the infrastructure mode communication and in the ad hoc mode communication.

However, when each terminal performs the ad hoc mode communication in an autonomous distributed manner using the same radio resource in an area where the infrastructure mode communication under the control of the base station is possible (infrastructure mode communication area), a problem occurs in which a terminal of the transmission partner cannot receive a radio wave due to interference between radio waves of both communications, and a case where the radio resource cannot be efficiently used may occur.

In addition, when a radio wave is emitted using the ad hoc mode communication from a terminal which is out of reach of a radio wave from the base station and uncontrollable, and which has come into a place where the radio wave reaches a terminal in the area of the base station irrespective of scheduling performed by the base station, there arises a problem of a so-called hidden terminal that mutual interference between the radio wave emitted from the terminal and the radio wave emitted from the base station prevents communication to a terminal in the base station area. Therefore, it is still impossible to circumvent the problem that the use efficiency of a radio resource in the base station area is thereby reduced.

As a technology for solving the problems mentioned above, there is a proposed technology which prevents radio wave interference by a terminal in a base station area with infrastructure mode communication. As described in Japanese Patent Application No. 2006-188270 (filed by the same applicant on Jul. 7, 2006), a base station rather intensely emits a control signal in advance to a range having the fear of interfering with an area under the control of the base station (infrastructure mode communication area), thereby advertising information on a radio resource used by the base station. A terminal outside the infrastructure mode communication area, which has received the radio resource information, performs the ad hoc mode communication using a radio resource other than the radio resource used by the base station.

In addition, as described in Japanese Patent Application No. 2006-188271 (filed by the same applicant on Jul. 7, 2006), there is proposed a technology in which, when a terminal in a base station area emits terminal-to-terminal communication information to a terminal outside the area, information on a radio resource used by the base station is added thereto, thereby preventing a terminal that has received the information from using the radio resource used by the base station for ad hoc mode communication.

As with the former one of the prior art technologies described above, in the case where a base station rather intensely transmits control information to an interfering area, even when a terminal of infrastructure mode communication does not exist in a base station area within a range in the reach of a radio wave from an in-coming terminal, and does not interrupt the infrastructure mode communication due to interference, a terminal of ad hoc mode communication outside the area cannot use a radio resource used by the base station, which excessively limits the ad hoc mode communication, and interrupts effective use of the radio resource.

Moreover, ad hoc mode communication performed by a vehicle at a point where the control information from the base station does not arrive under the influence of a shielding object lying midway in a communication path or the like may affect reception performed by a terminal in the base station area (problem of a hidden terminal). When the intensity of the radio wave of the control information from the base station is further increased in order to avoid the phenomenon, the control information reaches even a range which does not interfere with the interior of the base station area in a direction in which a shielding object does not exist. Thus, the use of the radio resource with respect to a terminal which performs the ad hoc mode communication is still excessively limited.

The following is a related art to the invention.
[Patent document 1] Japanese Patent Laid-Open Publication No. JP 2003-249939

SUMMARY

According to a first aspect of the disclosures made herein, a terminal device capable of receiving a signal transmitted from a base station includes a receiving unit that receives the signal transmitted from the base station; and a transmitting unit that detects, based on the signal received by the receiving unit, information on a radio resource usable for terminal-to-terminal communication and a transmission timing for the information, and transmits the information at the detected transmission timing.

Here, the information contains one of the radio resource usable for the terminal-to-terminal communication and a radio resource restricted from being used for the terminal-to-terminal communication.

According to a second aspect of the disclosures made herein, a terminal device capable of receiving signals transmitted from other terminal devices includes a receiving unit that receives the signals transmitted from the other terminal devices at the same timing; and a transmitting unit that detects, based on the signals received by the receiving unit, a radio resource usable for terminal-to-terminal communication, and performs terminal-to-terminal transmission limited to the radio resource to another terminal device.

According to a third aspect of the disclosures made herein, a communication method in a terminal device capable of receiving a signal transmitted from a base station includes receiving the signal transmitted from the base station; and detecting, based on the received signal, information on a radio resource usable for terminal-to-terminal communication and a transmission timing for the information, and transmitting the information at the detected transmission timing.

According to a fourth aspect of the disclosures made herein, a communication method in a terminal device capable of receiving signals transmitted from other terminal devices includes receiving the signals transmitted from the other terminal devices at the same timing; and detecting, based on the received signals, a radio resource usable for terminal-to-terminal communication, and performing terminal-to-terminal transmission limited to the radio resource to another terminal device.

According to a fifth aspect of the disclosures made herein, a mobile radio communication method in which a radio resource is shared with a first communication between one of first mobile terminal devices and a radio base station, which is performed by using an infrastructure mode for performing communication controlled based on scheduling by the radio base station, and a second communication between a plurality of second mobile terminal devices, which is performed by using an ad hoc mode for performing communication by autonomous distributed control, the mobile radio communication method includes advertising, by the one of the first mobile terminal devices in an area in which the radio base station exists, at a timing specified by the radio base station, a radio resource which is usable for the second communication in the ad hoc mode and is not used for the first communication in the infrastructure mode, to one of the second mobile terminal devices that is present in a range which a radio wave reaches from the one of the first mobile terminal devices and performs the second communication in the ad hoc mode, to thereby control the one of the second mobile terminal devices so as not to use a radio resource for the first communication.

The objects and advantages of the invention will be realized and attained by means of the elements and combinations particularly pointed out in the claims.

DESCRIPTION OF EMBODIMENTS

Figure 1:
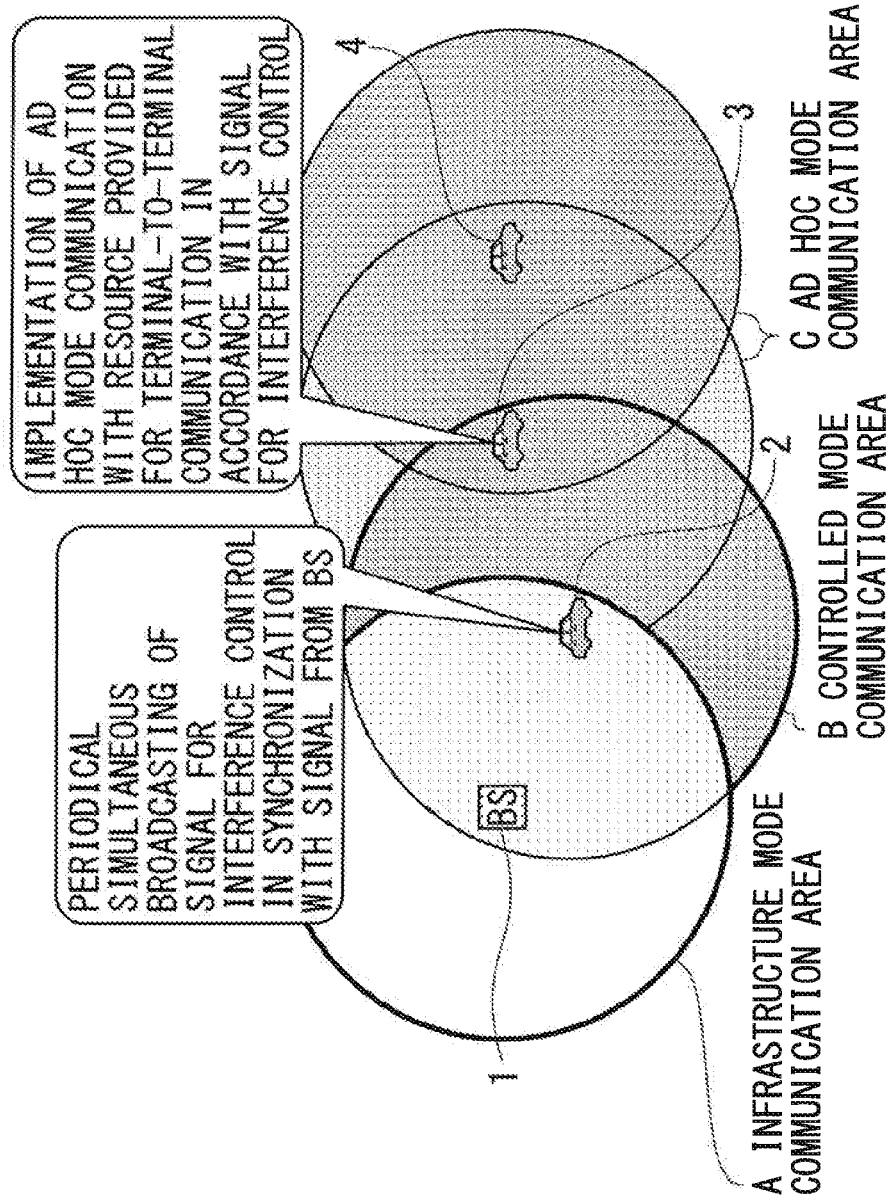
FIG. 1 is a block diagram illustrating a configuration of a mobile radio communication system according to an embodiment.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Mobile Radio Communication System]

Referring to FIG. 1 illustrating a configuration of a system according to the embodiment of the invention, in a mobile radio communication system SYS including a radio resource sharing function, a radio base station (base station BS) 1 controls infrastructure mode communication (referred to also as IM communication when any limitation is not particularly needed) with a mobile radio communication terminal device (terminal) 2 in an area (infrastructure mode communication area) A under the control of the base station 1, while managing a radio resource (frequency and/or time) in the area A.

The terminal 2 that performs the IM communication in the base station area A performs data transmission to the base station 1 and other terminals 3 and 4 according to the scheduling of the radio resource performed by the base station 1, and transmits, as control information (interference control information), information on a radio resource usable for terminal-to-terminal communication (or not used in the base station area A) toward the terminals 3 and 4 outside the area A at a timing specified by the base station 1. Information on a radio resource whose use in the terminal-to-terminal communication is inhibited (or which is used for the IM communication in the base station area) may be transmitted as the control information, and a receiver side may use a radio resource while avoiding the use of the radio resource used for the IM communication.

Note that the radio resource information can also be acquired through the reception thereof from the base station 1. Through the reception of the same radio resource information by a plurality of terminals and through the transmission of the same radio resource information therefrom at the same timing (synchronous timing), it is possible to prevent a stress on a transmission bandwidth. In addition, it is possible to transmit the radio resource information to terminals in the surroundings with a lower power due to a diversity effect.

The terminal 3 performs controlled mode communication (referred to also as CM communication when any limitation is not particularly needed) outside the base station area A. The CM communication is communication based on the control information. The terminal 3 receives the information (control information) on the radio resource used in the base station area A from the terminal 2 of the IM communication. Then, the terminal 3 detects a radio resource usable for the terminal-to-terminal communication (or not used by the base station 1), and implements, using the radio resource, the terminal-to-terminal communication in an ad hoc mode with another terminal.

The terminal 4 that performs ad hoc mode communication (referred to also as AM communication when any limitation is not particularly needed) outside the base station area A implements the terminal-to-terminal communication with the terminal 3 in its surroundings or the like in a controlled mode communication area B and an ad hoc mode communication area C by autonomous distributed control.

Depending on the presence or absence of the reception of signals (a preamble signal for detecting synchronization and downlink (DL) information) from the base station 1 and presence or absence of the reception of a preamble signal for interference control and the interference control information from the terminal 2 in the base station area A, the individual terminals 2, 3, and 4 in the mobile radio communication system SYS selectively perform the infrastructure mode communication, the controlled mode communication, and the ad hoc mode communication.

In the base station area A, the terminal 2 that has received a signal (e.g., preamble signal) from the base station 1 operates in an infrastructure mode, performs communication using a radio resource in accordance with the scheduling performed by the base station 1, and transmits a radio resource information usable for the terminal-to-terminal communication (or radio resource information used or not used by the base station 1) as the control information (interference control information) to the terminal 3 outside the area A at the timing specified by the base station 1, which is the same as the timings of the other terminals in the area A.

Outside the base station area A, the terminal 3 that has received the information of the radio resource used by the base station 1 as the control information (interference control information) from the terminal 2 of the IM communication operates in a controlled (interference) mode, and implements the terminal-to-terminal communication in an autonomous distributed manner using a radio resource usable for the terminal-to-terminal communication (or not used by the base station 1) based on the received interference control information.

Outside the base station area A, the terminal 4 that does not receive the control information (interference control information) from the terminal 2 of the IM communication operates in the ad hoc mode, and implements the terminal-to-terminal communication in an autonomous distributed manner using all the usable radio resources.

[Mobile Radio Communication Terminal Device]

Figure 2:
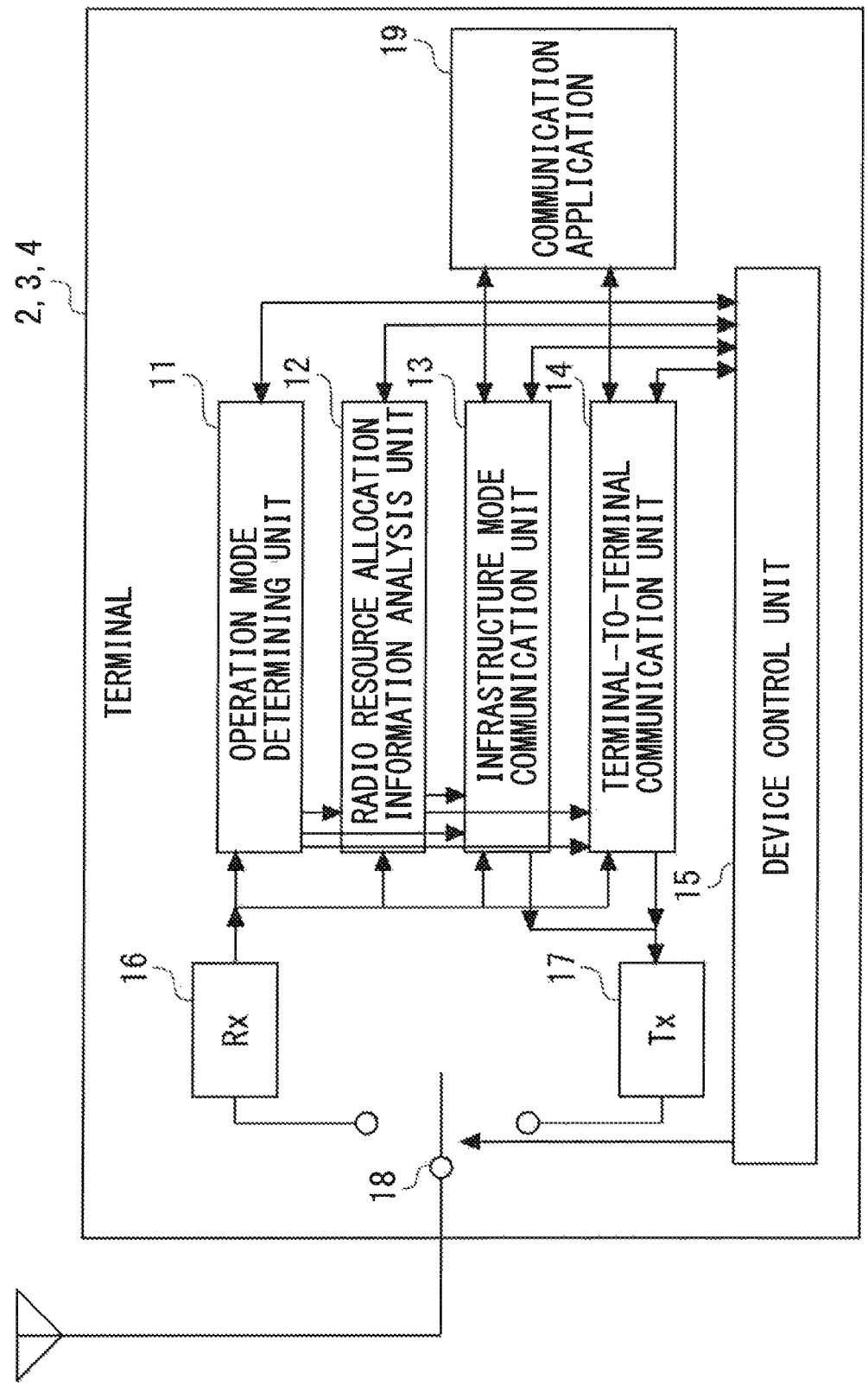
FIG. 2 is a block diagram illustrating a configuration of a mobile radio communication terminal device applied to the mobile radio communication system according to the embodiment.

In the mobile radio communication system SYS according to the embodiment illustrated in FIG. 1, each of the terminals 2, 3, and 4 adopts the configuration illustrated in FIG. 2. As illustrated FIG. 2, each of the terminals 2, 3, and 4 includes an operation mode determining unit 11, a radio resource allocation information analysis unit 12, an infrastructure mode communication unit 13, a terminal-to-terminal communication unit 14, and a device control unit 15. Each of the terminals 2, 3, and 4 further includes a receiver (Rx) 16, a transmitter (Tx) 17, a switching unit (SW) 18, and a communication application (software) 19.

The operation mode determining unit 11 in each of the terminals 2, 3, and 4 detects the signal (e.g. preamble (I) or preamble (C)) in a signal received from the base station 1 or from another terminal in the base station area A, and a peripheral terminal via the switching unit 18 and the receiver 16, and determines the infrastructure mode, the controlled mode, or the ad hoc mode as an operation mode in accordance with the state of detection of the signal.

Figure 3:
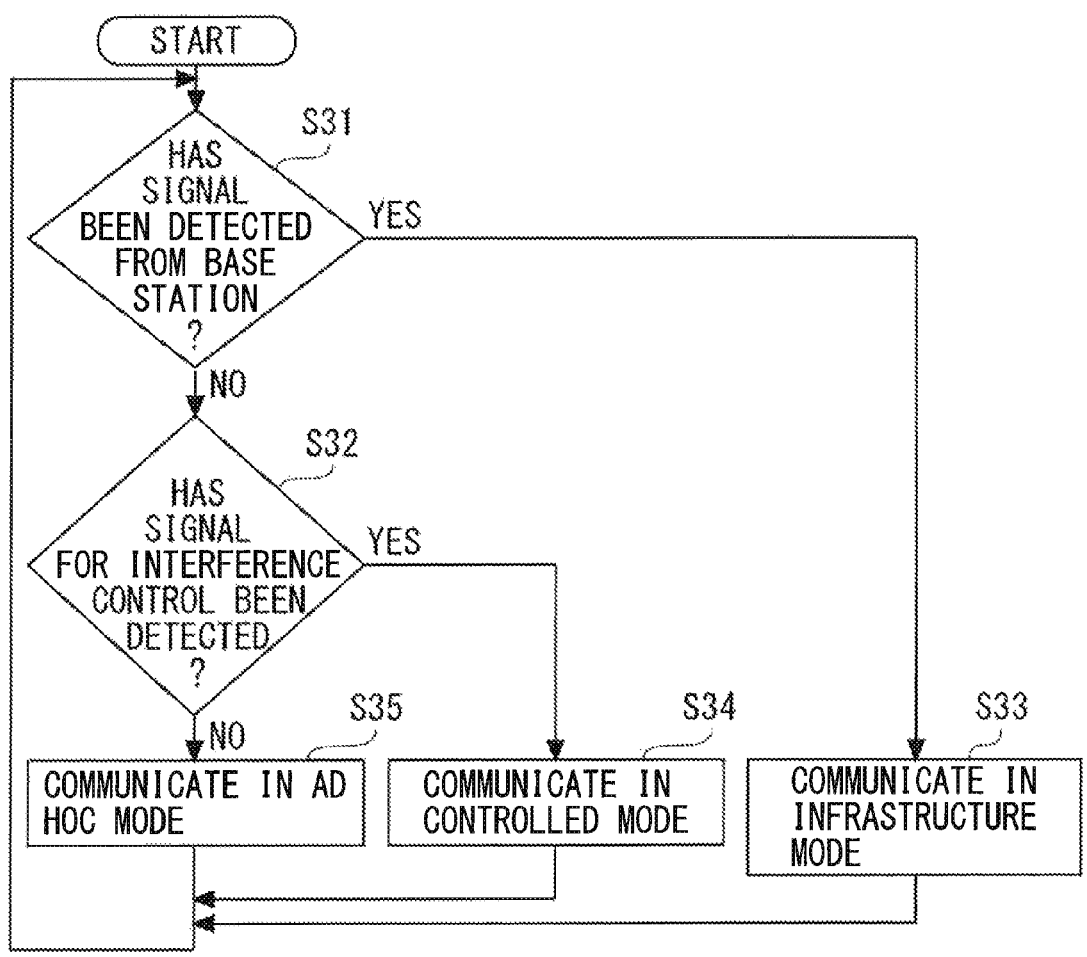
FIG. 3 is a view for illustrating a function of the mobile radio communication terminal device illustrated in FIG. 2.

That is, the operation mode determining unit 11 first determines whether or not a signal (e.g., preamble signal) has been received from the base station (S31 of FIG. 3). When the operation mode determining unit 11 has detected a signal from the base station, the terminal 2, 3, or 4 has entered the radio area of the base station, and hence shifts to the infrastructure mode communication (S33).

On the other hand, when the operation mode determining unit 11 has not detected a signal from the base station, the operation mode determining unit 11 determines whether or not the control information (interference control information) transmitted from another terminal has been received. It is also possible to assume that the control information starting with the preamble signal is the interference control information, and to perform determination by detecting the preamble (S32).

Here, when the control information has been received, the terminal 2, 3, or 4 shifts to the controlled mode communication (S34). When the control information has not been received, the terminal 2, 3, or 4 shifts to the ad hoc mode communication (S35).

It is to be noted that radio resource allocation information (time allocation information) defines transmission regions in an uplink direction (direction from the terminal to the base station or the like) and in a downlink direction (direction from the base station to the terminal).

Figure 4:
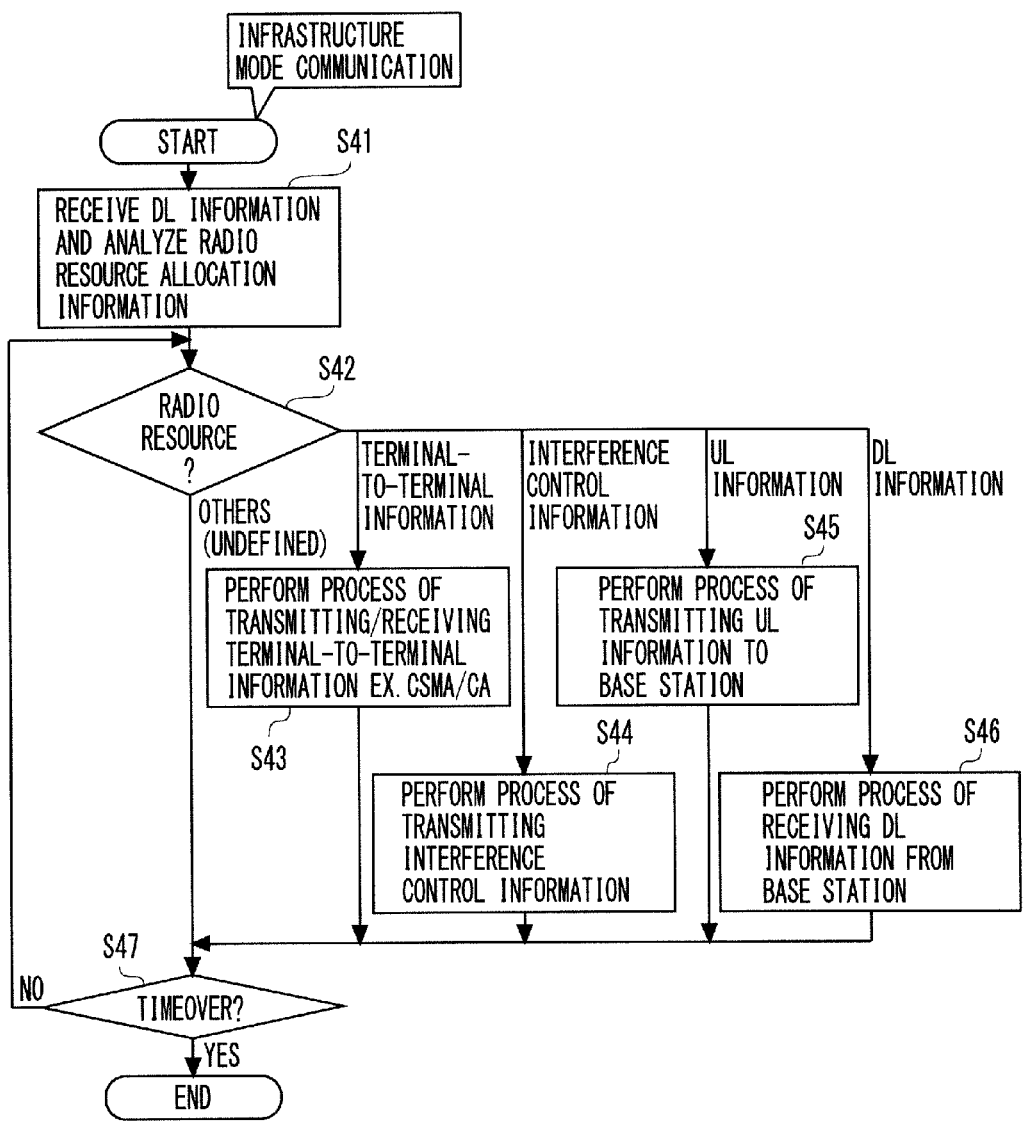
FIG. 4 is a view for illustrating another function of the mobile radio communication terminal device illustrated in FIG. 2.

Next, a description is given of the operation of the terminal when the terminal has shifted to the infrastructure mode communication with reference to FIG. 4.

When the terminal has shifted to the infrastructure mode communication, the radio resource allocation information analysis unit 12 receives the DL information, and analyzes the radio resource allocation information included in the DL information (S41). The radio resource allocation information may include a transmission/reception region (which is information on a transmission/reception timing, a channel, and the like, and referred to also as a radio resource) used for radio communication with the base station, a transmission/reception region used for radio communication between the terminals, and a transmission region for the interference control information.

Next, based on the result of the analysis of the radio resource allocation information, the device control unit 15 controls the terminal-to-terminal communication unit 14 such that terminal-to-terminal information is subjected to a transmission/reception process (S43) at a transmission/reception timing for the terminal-to-terminal information. The transmission/reception timing for the terminal-to-terminal information may also be set such that radio communication is performed by an autonomous distributed way such as carrier sense multiple access with collision avoidance (CSMA/CA) in a region specified by the radio resource allocation information.

In addition, based on the result of the analysis of the radio resource allocation information, the device control unit 15 controls the terminal-to-terminal communication unit 14 such that terminal-to-terminal communication unit 14 transmits the interference control information at a transmission timing for the interference control information (S44). Further, the device control unit 15 controls the infrastructure mode communication unit 13 such that the infrastructure mode communication unit 13 performs the transmission/reception of UL information and the DL information at a timing of transmission to the base station and at a timing of reception from the base station based on the UL information and the DL information included in the radio resource allocation information (S45 and S46).

Note that, at a timing corresponding to an undefined region, the transmission/reception process is not performed, and the operation of the terminal advances to S47. When transmission of each type is performed, it is determined whether or not a timeover T.O has occurred (one radio frame has elapsed) (S47). When one radio frame has not elapsed, the operation of the terminal returns to S42 in which the transmission/reception of another piece of information is performed.

When the timeover has occurred here (when the next radio frame period has begun), the mode determination process of FIG. 3 is performed again, and the terminal operates again in accordance with the determined mode. Note that it is also possible to set a timer based not on one radio frame time, but on a plurality of radio frame times.

Figure 5:
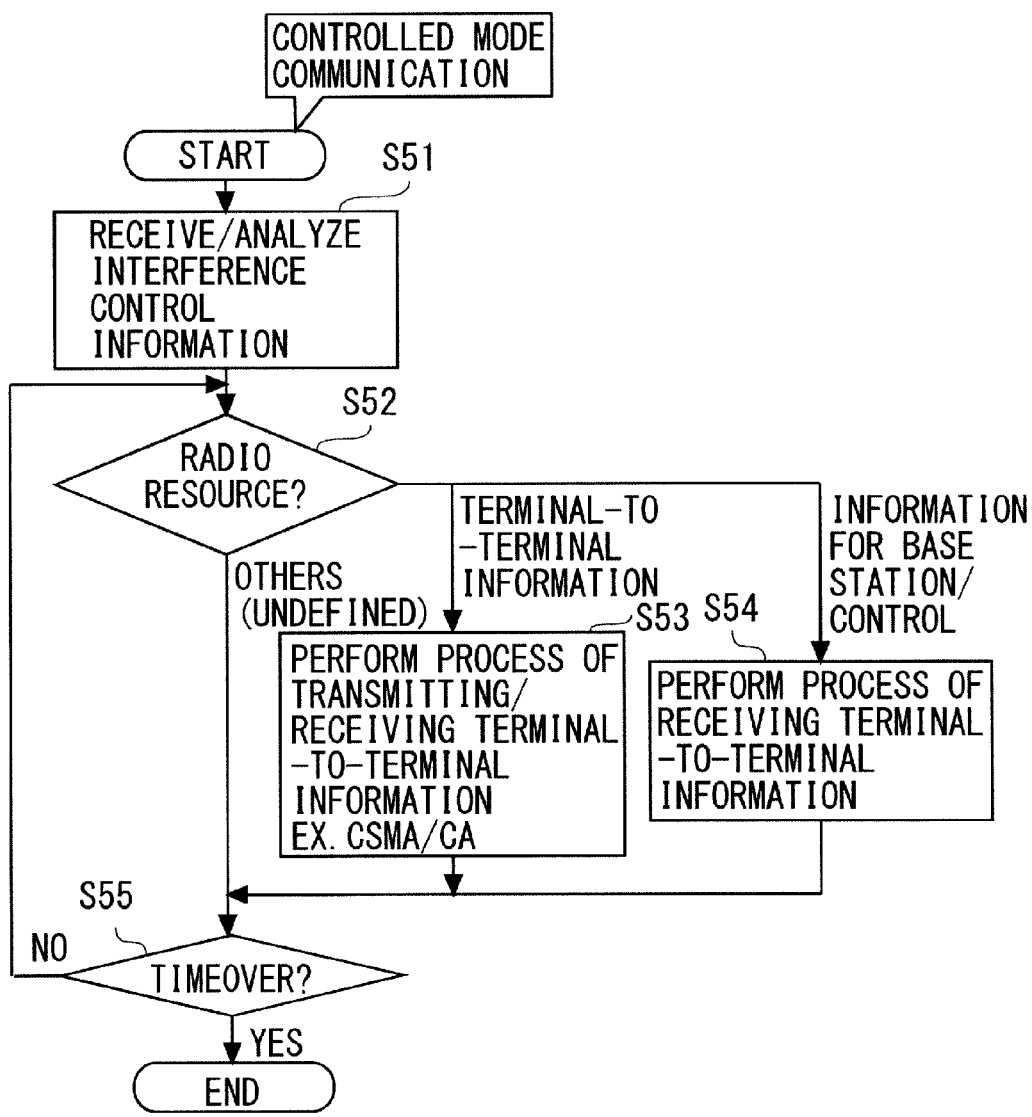
FIG. 5 is a view for illustrating still another function of the mobile radio communication terminal device illustrated in FIG. 2.

Next, a description is given of the operation of the terminal when the terminal has shifted to the controlled mode communication with reference to FIG. 5.

When the terminal has shifted to the controlled mode communication, the radio resource allocation information analysis unit 12 receives the interference control information subsequent to the preamble for the interference control information, and analyzes the interference control information (S51). Then, the terminal performs the transmission/reception of the terminal-to-terminal information in a region allowed by the interference control information (S53). At that time, communication may be performed by an autonomous distributed way such as the CSMA/CA in the allowed region.

In addition, the terminal also receives the terminal-to-terminal information from another terminal (terminal in the ad hoc mode communication) in a region other than the region allowed by the interference control information (S54). Note that, at the timing corresponding to the undefined region, the terminal does not perform the transmission/reception process, and the operation of the terminal advances to S55.

When transmission of each type is performed, it is determined whether or not the timeover T.O has occurred (one radio frame has elapsed) (S55). When one radio frame has not elapsed, the operation of the terminal returns to S52 in which the transmission/reception of another piece of information is performed. When the timeover has occurred here (when the next radio frame period has begun), the mode determination process of FIG. 3 is performed again, and the terminal operates again in accordance with the determined mode. Note that it is also possible to set the timer based not on one radio frame time, but on a plurality of radio frame times.

Figure 6:
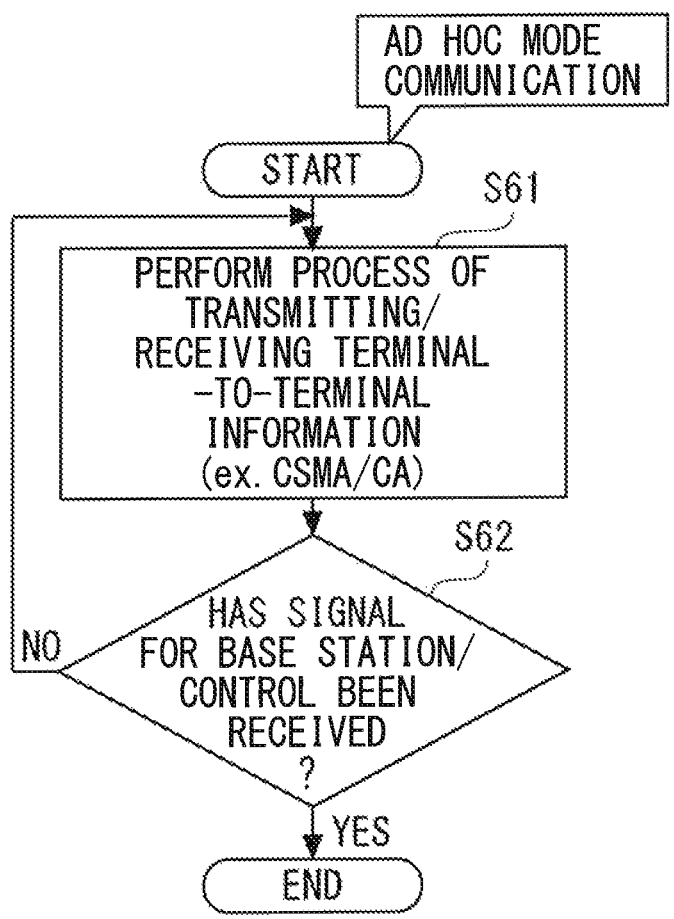
FIG. 6 is a view for illustrating a further function of the mobile radio communication terminal device illustrated in FIG. 2.

Next, a description is given of the operation of the terminal when the terminal has shifted to the ad hoc mode communication with reference to FIG. 6.

When the terminal has shifted to the ad hoc mode communication, the terminal performs communication by an autonomous distributed way such as the CSMA/CA (S61). For the communication region, it is possible not to place a particular limitation thereon.

This process is repeated until the signal transmitted from the base station or the interference control information transmitted from the terminal of the infrastructure mode communication is received and, when any one of the signals is received, the terminal performs a mode shift based on the determination of FIG. 3 (S62).

Examples of Operation

Next, a description is given of examples of an operation in the mobile radio communication system SYS according to the embodiment of the invention with reference to FIGS. 1 and 2, and related drawings (FIGS. 7 to 12) in combination.

Figure 7:
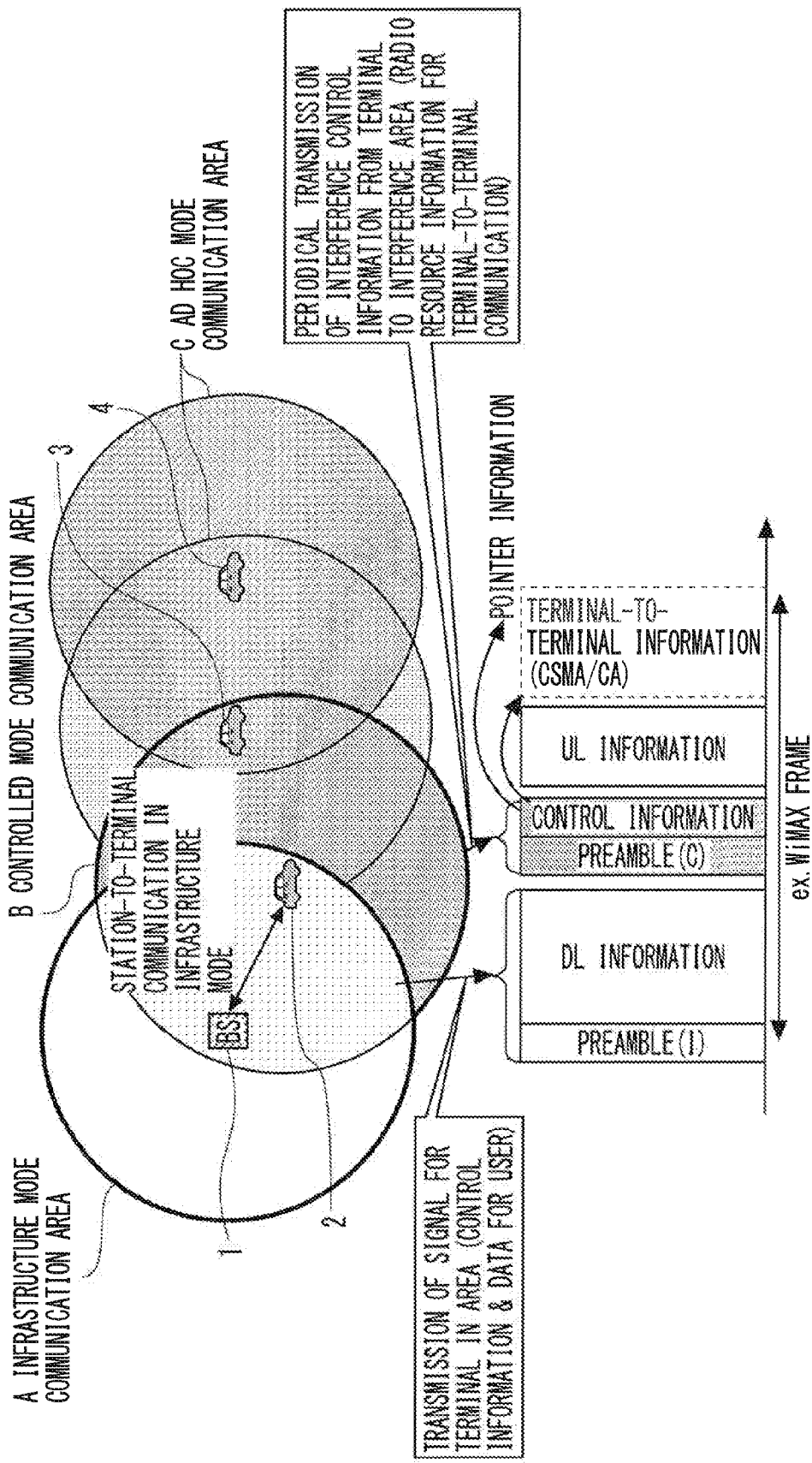
FIG. 7 is a view for illustrating an example of an operation of the mobile radio communication system according to the embodiment.

As illustrated in FIG. 7, a description is given here of an example of the operation when the mobile radio communication system SYS described above is applied to road-to-vehicle communication between the road-side device (base station BS) 1 and the vehicle-mounted device (mobile terminal) 2 and to inter-vehicle communication among the vehicle-mounted devices 2, 3, and 4 in an intelligent transport system (ITS).

In this example of the operation, it is assumed that the road-to-vehicle communication in the ITS is based on, e.g., worldwide interoperability for microwave access (WiMAX), and that the road-side device 1 performs complete scheduling of a radio resource in the area (infrastructure mode communication area) A under control of the road-side device 1.

In the WiMAX frame illustrated in FIG. 7, the preamble signal (preamble (I)) for detecting synchronization and the downlink (DL) information are signals transmitted from the road-side device 1 toward the terminal 2 in the area A.

In addition, the preamble signal (preamble (C)) for interference control and the interference control information are signals periodically transmitted from the vehicle-mounted device 2 in the area A in which the road-side device 1 exists to the controlled mode communication area B as an interference area. Contention-based terminal-to-terminal information is radio resource information (regional information) for communication between the vehicle-mounted devices (terminals) specified with the interference control information serving as a pointer.

Figure 8:
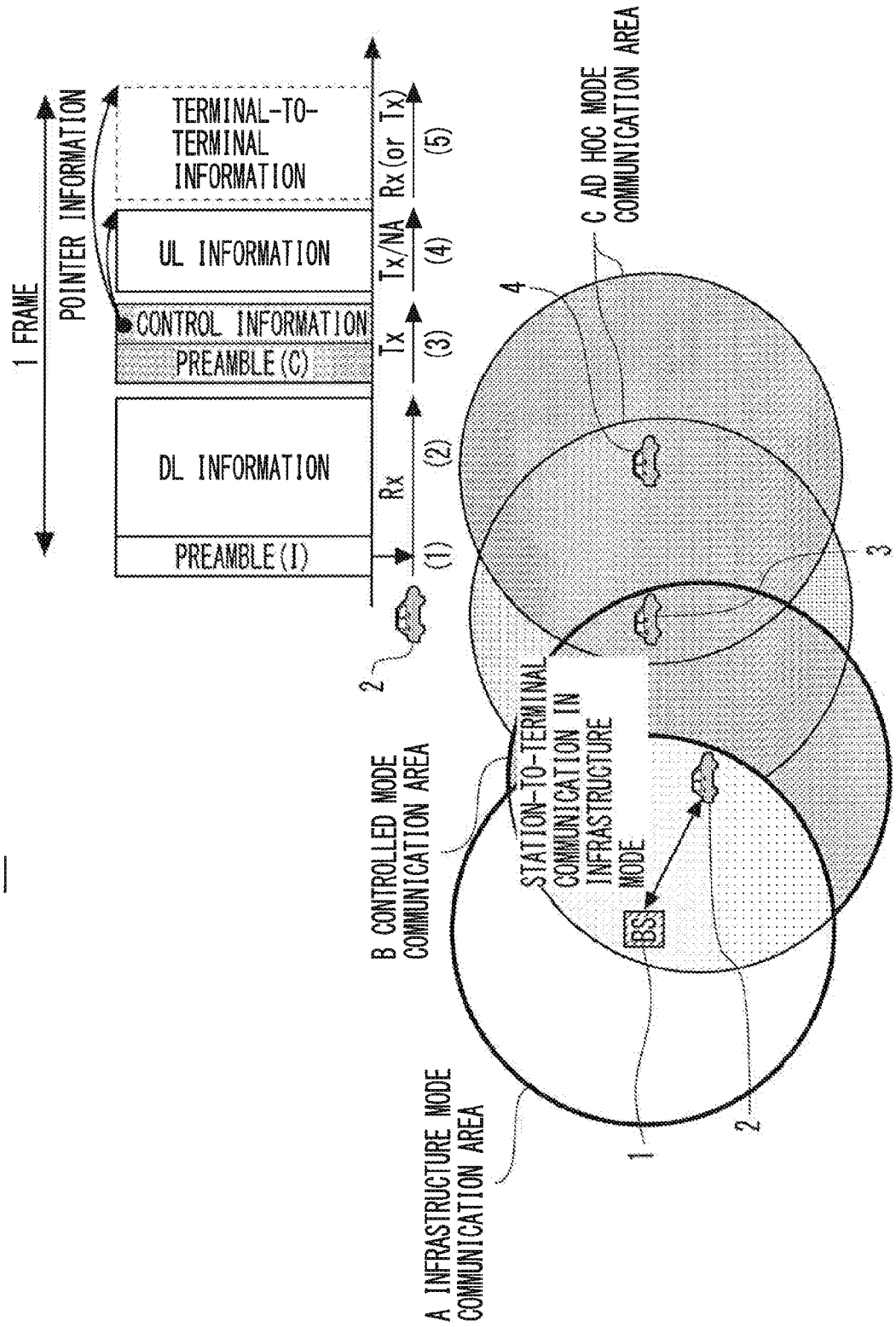
FIG. 8 is a view for illustrating another example of the operation of the mobile radio communication system according to the embodiment.

FIG. 8 is a view for illustrating an operation of the vehicle-mounted device 2 in the infrastructure mode communication area A in which the road-side device 1 exists. The vehicle-mounted device 2 in the area A operates as an IM communication terminal, and receives information from the road-side device 1, while transmitting information to the road-side device 1, according to the scheduling performed by the road-side device 1.

In addition, the vehicle-mounted device 2 transmits information on a radio resource usable for the terminal-to-terminal communication (or not used for communication in the road-side device area A), such as a time unit (time zone) in the WiMAX frame serving as the interference control information to the terminals 3 and 4 outside the area A at the timing specified by the road-side device 1. Note that this timing is a timing common to the plurality of vehicle-mounted devices serving under the road-side device 1.

Further, the vehicle-mounted device 2 transmits information for the inter-vehicle communication by autonomous distributed control based on, e.g., collision avoidance by the CSMA/CA, by using the radio resource usable for the terminal-to-terminal communication (or not used for communication in the road-side device area A).

The vehicle-mounted device 2 in the area A of the road-side device 1 transmits/receives each signal in the frame illustrated in FIG. 8 through the cooperation of the components illustrated in FIG. 2 according to the following procedures.

(1) By receiving the preamble signal (preamble (I)) for detecting synchronization, the vehicle-mounted device 2 selects the operation in the infrastructure mode.

(2) The vehicle-mounted device 2 receives the control information (radio resource allocation information) and the DL information from the road-side device (BS) 1.

(3) Under the control performed by the road-side device 1, the vehicle-mounted device 2 transmits the interference control information.

(4) Under the control performed by the road-side device 1, the vehicle-mounted device 2 transmits the UL information. It is to be noted that NA indicates no action.

(5) Under the control performed by the road-side device 1, the vehicle-mounted device 2 receives or transmits the terminal-to-terminal resource information.

Figure 9:
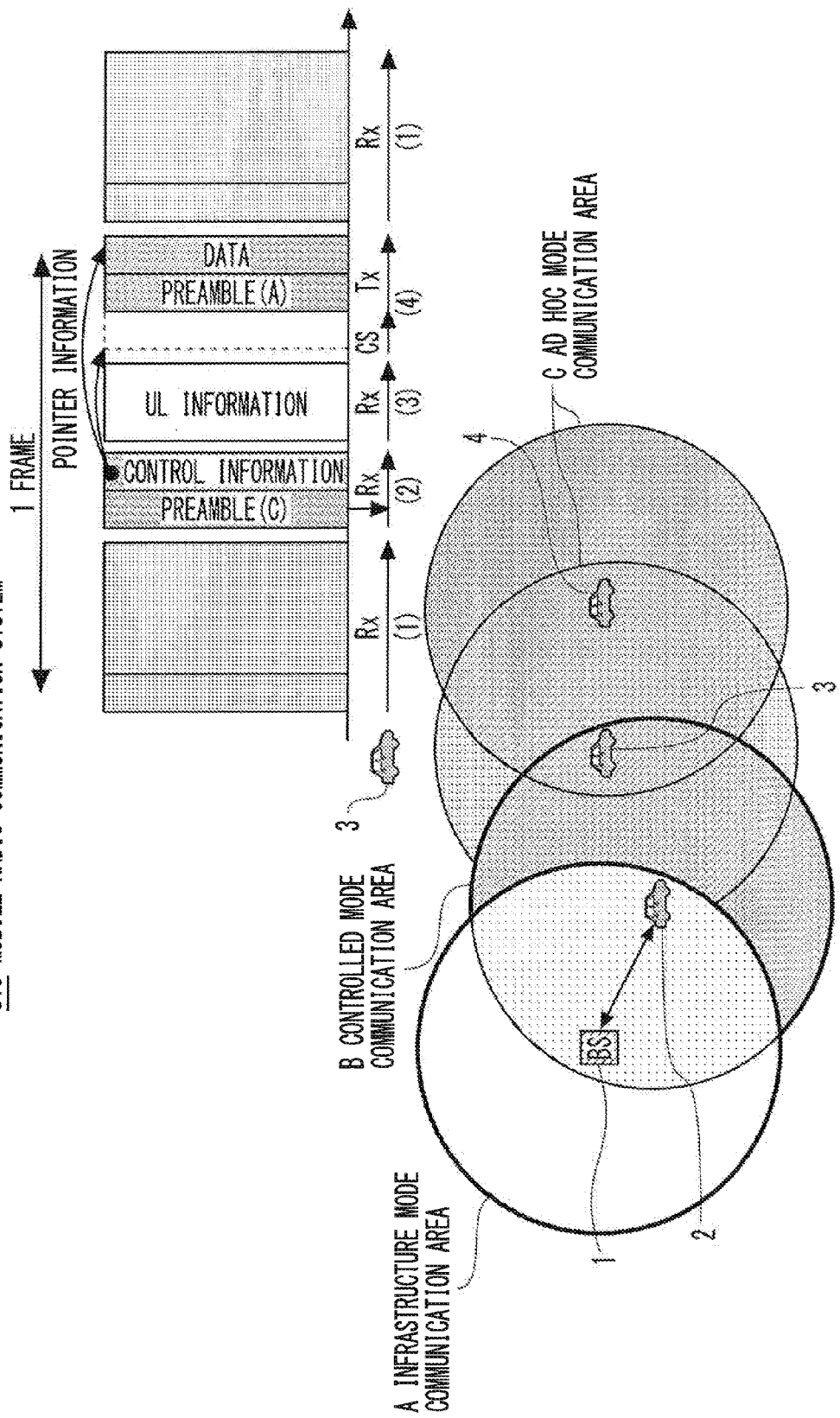
FIG. 9 is a view for illustrating still another example of the operation of the mobile radio communication system according to the embodiment.

FIG. 9 is a view for illustrating an operation of the vehicle-mounted device 3 out of the vehicle-mounted devices 3 and 4 each present outside the area A where the road-side device 1 exists, which has received the interference control information from the vehicle-mounted device 2 serving as the IM communication terminal, and is present in the controlled mode communication area (interference area) B.

The vehicle-mounted device 3 operates as a CM communication terminal, and transmits information for the inter-vehicle communication by autonomous distributed control based on, e.g., collision avoidance by the CSMA/CA by using a radio resource usable for the terminal-to-terminal communication (or not used by the road-side device 1) in accordance with the interference control information. In addition, the vehicle-mounted device 3 does not perform transmission using the radio resource unusable for the terminal-to-terminal communication (or used by the road-side device 1), and comes into a reception state.

The vehicle-mounted device 3 in the controlled mode communication area B transmits/receives each signal in the frame illustrated in FIG. 9 through the cooperation of the components illustrated in FIG. 2 according to the following procedures. Note that in FIG. 9, CS indicates a carrier sense state.

(1) The vehicle-mounted device 3 receives a radio wave in its surroundings. Note that a radio wave from the road-side device (BS) 1 does not arrive at the vehicle-mounted device 3, but the vehicle-mounted device 3 can receive a radio wave from the vehicle-mounted device 2 serving as the IM communication terminal.

(2) By receiving the preamble signal (preamble (C)) for the interference control from the vehicle-mounted device 2, the vehicle-mounted device 3 selects the operation in the controlled mode, and identifies the radio resource usable for the terminal-to-terminal communication based on the interference control information.

(3) The vehicle-mounted device 3 receives a radio wave in its surroundings. Note that the vehicle-mounted device 3 receives a radio wave directed from the vehicle-mounted device 2 of the IM communication toward the road-side device 1, but ignores the received radio wave, and the vehicle-mounted device 3 can receive a radio wave from the vehicle-mounted device 4 serving as an AM communication terminal.

(4) In accordance with the interference control information of (2), the vehicle-mounted device 3 transmits information in a contention-based mode (by the CSMA/CA here) using the radio resource for the terminal-to-terminal communication.

Figure 10:
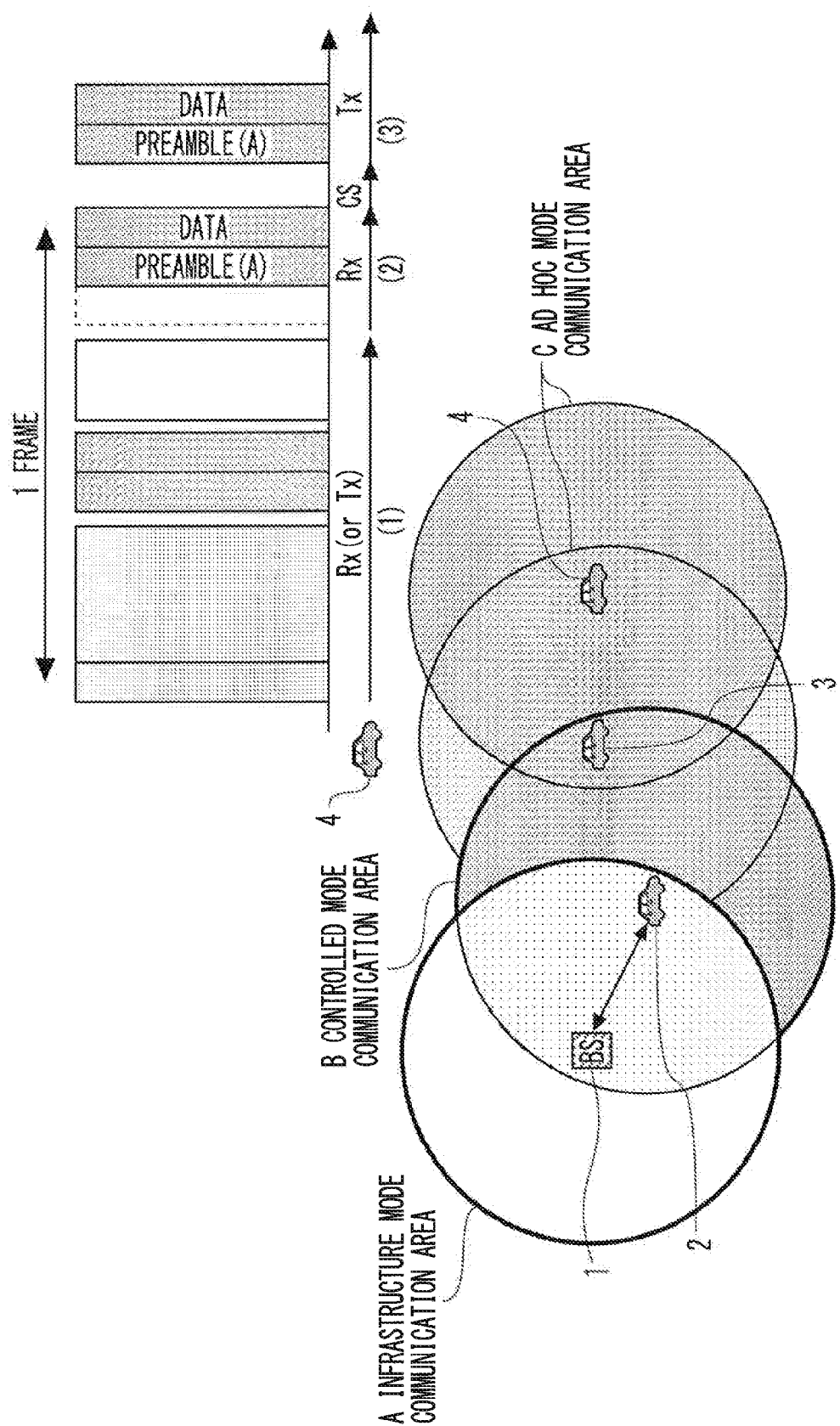
FIG. 10 is a view for illustrating a further example of the operation of the mobile radio communication system according to the embodiment.

FIG. 10 is a view for illustrating an operation of the vehicle-mounted device 4 out of the vehicle-mounted devices 3 and 4 each outside the area A where the road-side device 1 exists, which does not receive the interference control information from the vehicle-mounted device 2 of the IM communication, and is in the ad hoc mode communication area C. The vehicle-mounted device 4 operates as the AM communication terminal, and transmits information for the inter-vehicle communication based on, e.g., the collision avoidance by the CSMA/CA by using a radio resource in an autonomous distributed manner.

The vehicle-mounted device 4 in the ad hoc mode communication area C transmits/receives each signal in the frame illustrated in FIG. 10 through the cooperation of the components illustrated in FIG. 2 according to the following procedures. Note that in FIG. 10, CS indicates the carrier sense state.

(1) The vehicle-mounted device 4 receives a radio wave in its surroundings. Note that radio waves from the road-side device 1 and from the vehicle-mounted device 2 of the IM communication do not arrive at the vehicle-mounted device 4, but the vehicle-mounted device 4 can receive radio waves from the vehicle-mounted device 3 of the CM communication and from the other vehicle-mounted devices of the AM communication (not shown). In addition, the vehicle-mounted device 4 transmits information in a contention-based mode (by the CSMA/CA here).

(2) The vehicle-mounted device 4 receives a radio wave in its surroundings. Note that radio waves from the road-side device 1 and from the vehicle-mounted device 2 of the IM communication do not arrive at the vehicle-mounted device 4, but the vehicle-mounted device 4 can receive radio waves from the vehicle-mounted device 3 of the CM communication and from the other vehicle-mounted devices of the AM communication (not shown).

(3) The vehicle-mounted device 4 transmits information in a contention-based mode (by the CSMA/CA here).

Figure 11:
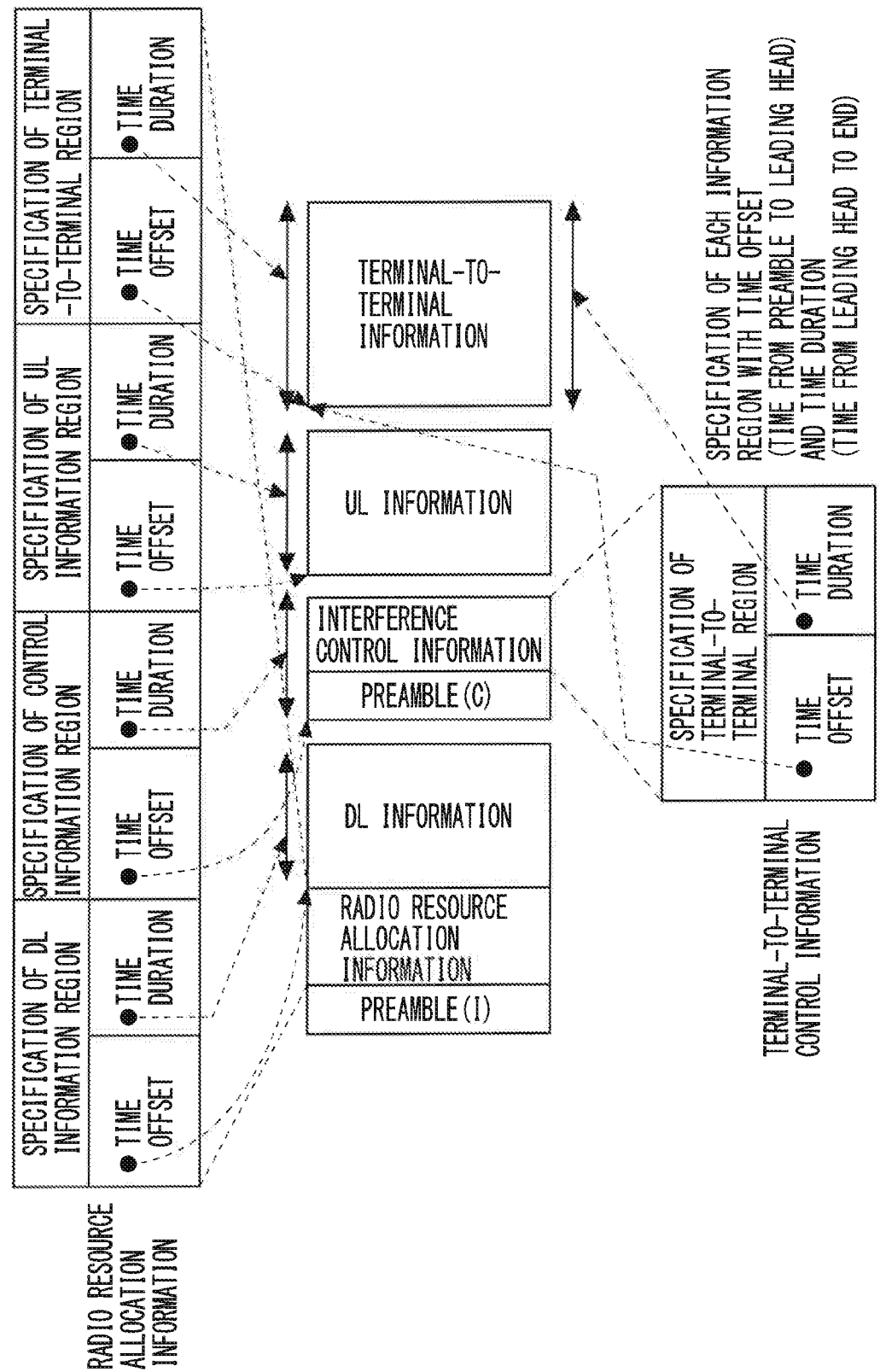
FIG. 11 is a view illustrating an example of creation of radio resource allocation information and interference control information of a frame applied the operation in the mobile radio communication system according to the embodiment.
Figure 12:
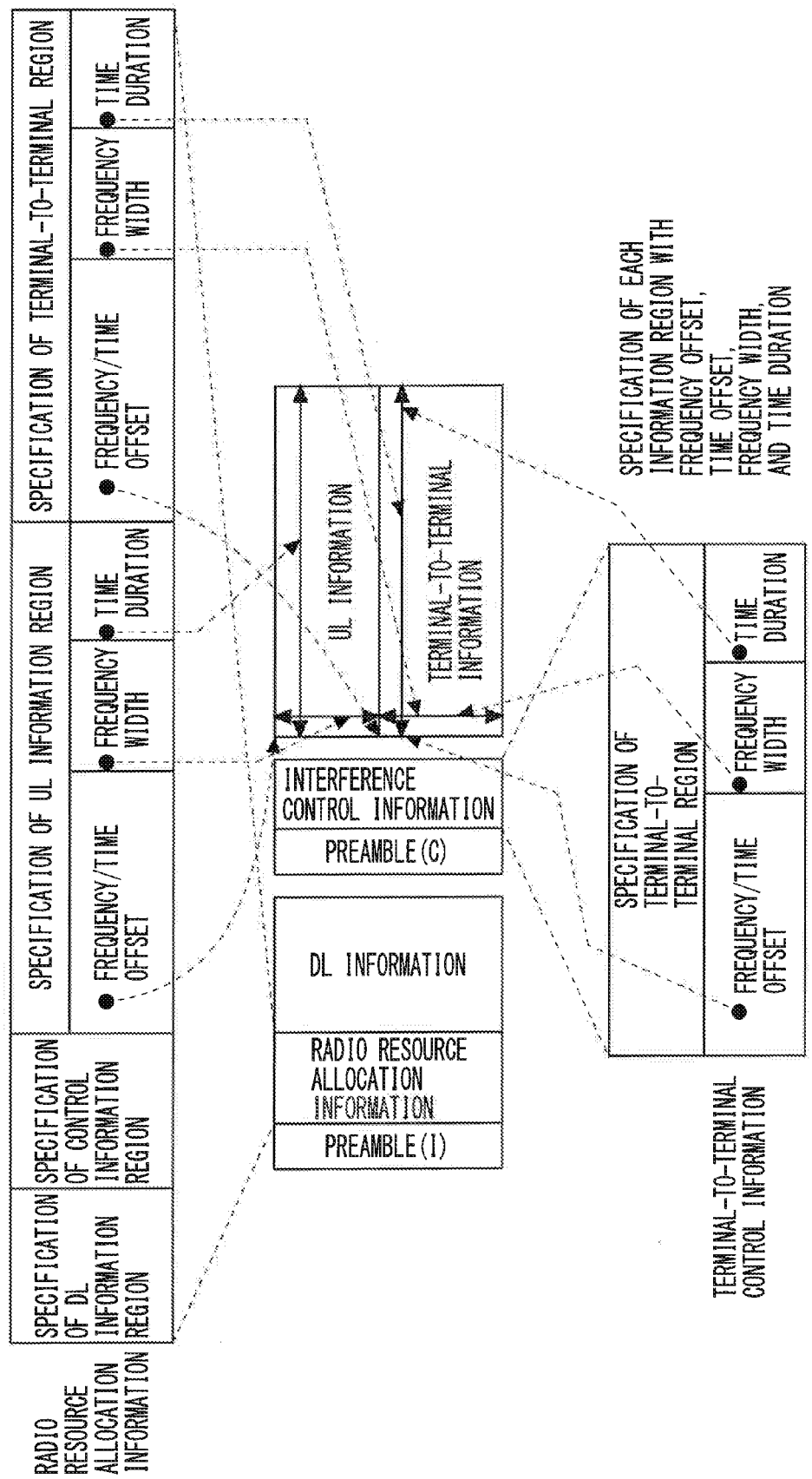
FIG. 12 is a view illustrating another example of the creation of the radio resource allocation information and interference control information of the frame applied to the operation in the mobile radio communication system according to the embodiment.

FIGS. 11 and 12 illustrate examples of creation of the radio resource allocation information and the interference control information of a frame applied to the operation in the above-mentioned mobile radio communication system SYS according to the embodiment of the invention.

FIG. 11 illustrates the case where time division multiple access (TDMA) is adopted as a radio access method. The radio resource allocation information specifies each information region in the frame with a time offset (time from the preamble to the leading head) and with a time duration (time from the leading head to the end).

In addition, FIG. 12 illustrates the case where TDMA and frequency division multiple access (FDMA) are adopted as a radio access method. The radio resource allocation information specifies each information region in the frame with a frequency offset, a time offset, a frequency width (bandwidth), and a time duration.

[Variations]

The embodiment described above has adopted the method in which the vehicle-mounted device 2 in the area A of the road-side device 1 advertises the radio resource information for the ad hoc mode communication to the vehicle-mounted device 3. However, a method may also be adopted in which the vehicle-mounted device 2 advertises radio resource information for the infrastructure mode communication, and the vehicle-mounted device 3 does not use the advertised resource in its transmitting.

The embodiment described above has adopted the method in which the vehicle-mounted device 2 in the area A of the road-side device 1 simultaneously broadcasts the radio resource information for the vehicle-to-vehicle communication as the interference control information. However, only a vehicle-mounted device which has received a radio wave or radio wave interference from a vehicle-mounted device outside the infrastructure mode area A may broadcast the radio resource information. In, addition, the vehicle-mounted device that broadcasts the radio resource information may be specified by the road-side device 1, and only a vehicle-mounted device that exists at an edge section or vicinity of the edge section of the area A of the road-side device 1 may broadcast the radio resource information using positional information of the vehicle-mounted devices and the road-side device 1.

The process in the embodiment described above is provided as a program executable on a computer, and can be provided through a recording medium such as a CD-ROM or a flexible disk, and further through a communication network.

[Effects of the Embodiment]

According to the embodiment described above, it is possible to implement the infrastructure mode communication in the area where the radio base station exists, and the ad hoc mode communication in the area where the base station does not exist without entailing the radio wave interference caused by the ad hoc mode communication with the infrastructure mode communication even when the both modes share a radio resource.

In addition, the respective terminals in the base station area simultaneously broadcast the information on the radio resource used by the base station as a consequence, and hence the overhead of a radio resource necessary for advertising the information is accordingly reduced compared with the case where each of the terminals in the base station area individually broadcasts the radio resource information.

Further, compared with the case where the base station advertises information, it is possible to reduce restrictions placed by an unnecessary information on the ad hoc mode communication by a terminal outside the area and the influence of interference with the ad hoc mode communication due to no arrival of information.

[Aspects]

(Aspect 1)

A mobile radio communication method in which a radio resource is shared with a first communication between one of first mobile terminals and a radio base station, which is performed by using an infrastructure mode for performing communication concentratively controlled based on scheduling by the radio base station, and a second communication between a plurality of second mobile terminals, which is performed by using an ad hoc mode for performing communication by autonomous distributed control, the mobile radio communication method including periodically advertising, by the one of the first mobile terminals in an area in which the radio base station exists, at a timing specified by the radio base station, a radio resource which is used for the first communication in the infrastructure mode, to one of the second mobile terminals that is present in a range which a radio wave reaches from the one of the first mobile terminals and performs the second communication in the ad hoc mode, to thereby control the one of the second mobile terminals so as not to use the radio resource for the first communication, whereby interference is avoided.

(Aspect 2)

The mobile radio communication method according to Aspect 1, further including simultaneously broadcasting, by all of the first mobile terminals in the area in which the radio base station exists, information on the radio resource which is used for the first communication in the infrastructure mode.

(Aspect 3)

The mobile radio communication method according to Aspect 1, further including broadcasting, among the first mobile terminals in the area in which the radio base station exists, by the first mobile terminal which detects a radio wave or interference from the one of the second mobile terminals, information on the radio resource which is used for the first communication in the infrastructure mode.

(Aspect 4)

The mobile radio communication method according to Aspect 1, further including broadcasting, among the first mobile terminals in the area in which the radio base station exists, by the first mobile terminal which is specified by the radio base station, information on the radio resource which is used for the first communication in the infrastructure mode.

What is claimed is:

1. A mobile radio communication method in which a radio resource is shared with a first communication between one of first mobile terminal devices and a radio base station, using an infrastructure mode for performing communication that is controlled based on scheduling by the radio base station, and a second communication between a plurality of second mobile terminal devices, using an ad hoc mode for performing communication by autonomous distributed control, the mobile radio communication method comprising:

simultaneously broadcasting, by a plurality of or all of the first mobile terminal devices in an area in which the radio base station exists, at a timing specified by the radio base station, interference control information on a radio resource which is usable for the second communication in the ad hoc mode and is not used for the first communication in the infrastructure mode, to at least one of the second mobile terminal devices that is present in a range which a radio wave reaches from the plurality of or the all of the first mobile terminal devices, is present outside the area in which the radio base station exists and performs the second communication in the ad hoc mode, and limiting use of a radio resource for the first communication by between the second mobile terminal devices that are present outside the area in which the radio base station exists.

* * * * *